(12) United States Patent
Velayudhan et al.

(10) Patent No.: US 10,771,830 B2
(45) Date of Patent: *Sep. 8, 2020

(54) SYSTEMS AND METHODS FOR MANAGING CONTENT DISTRIBUTION TO AN IN-TRANSIT MEDIA SYSTEM

(71) Applicant: Viasat, Inc., Carlsbad, CA (US)

(72) Inventors: Nirmalkumar Velayudhan, San Marcos, CA (US); Brian T. Sleight, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,841

(22) Filed: May 7, 2019

(65) Prior Publication Data

US 2019/0364314 A1 Nov. 28, 2019

Related U.S. Application Data

(63) Continuation of application No. 15/209,415, filed on Jul. 13, 2016, now Pat. No. 10,334,009.

(60) Provisional application No. 62/288,600, filed on Jan. 29, 2016.

(51) Int. Cl.
| | | |
|---|---|---|
| *H04N 21/254* | (2011.01) | |
| *H04L 29/08* | (2006.01) | |
| *H04N 21/414* | (2011.01) | |
| *H04N 21/4627* | (2011.01) | |
| *H04N 21/214* | (2011.01) | |
| *H04N 21/258* | (2011.01) | |
| *H04N 21/835* | (2011.01) | |
| *H04L 29/06* | (2006.01) | |

(52) U.S. Cl.
CPC ....... *H04N 21/2541* (2013.01); *H04L 63/107* (2013.01); *H04L 65/4084* (2013.01); *H04L 67/12* (2013.01); *H04N 21/2146* (2013.01); *H04N 21/25841* (2013.01); *H04N 21/41422* (2013.01); *H04N 21/4627* (2013.01); *H04N 21/835* (2013.01)

(58) Field of Classification Search
CPC ..... H04L 65/60; H04L 67/12; H04N 21/2146; H04N 21/2541; H04N 21/25841; H04N 21/41422; H04N 21/4627; H04N 21/835
See application file for complete search history.

(56) References Cited

U.S. PATENT DOCUMENTS

| | | |
|---|---|---|
| 6,009,116 A | 12/1999 | Bedmarck et al. |
| 6,643,510 B2 | 11/2003 | Taylor |
| 6,937,985 B2 | 8/2005 | Kuma |
| 7,676,219 B2 * | 3/2010 | Williams ............ H04L 63/0492 455/411 |
| 8,244,886 B2 | 8/2012 | Short et al. |
| 8,311,533 B1 * | 11/2012 | Alcorn ............... H04B 7/18506 455/431 |

(Continued)

OTHER PUBLICATIONS

"Region Monitoring and iBeacon", Apple, Inc. 10 pages printed Oct. 1, 2015, https://developer.apple.com/library.ios/documentation/UserExperience/Conceptual/LocationAwarenessPG/RegionMonitoring/RegionMonitoring.html.

*Primary Examiner* — Jerry B Dennison

(74) *Attorney, Agent, or Firm* — Holland & Hart LLP

(57) ABSTRACT

Embodiments relate to methods and systems for managing media content distribution rights to a media client on a craft to ensure that the distribution of media content items is consistent with media content distribution rights.

20 Claims, 6 Drawing Sheets

(56) References Cited

U.S. PATENT DOCUMENTS

| | | | |
|---|---|---|---|
| 8,561,102 B1 * | 10/2013 | Mack | H04N 21/25841 |
| | | | 725/109 |
| 8,744,486 B2 * | 6/2014 | Cousins | H04W 4/021 |
| | | | 455/456.2 |
| 8,838,149 B2 | 9/2014 | Hasek | |
| 9,002,747 B2 | 4/2015 | Pedlow et al. | |
| 9,031,939 B2 | 5/2015 | Nissen | |
| 2013/0090129 A1 * | 4/2013 | Turner | H04W 12/08 |
| | | | 455/456.1 |
| 2014/0047485 A1 * | 2/2014 | Shaw | H04W 48/18 |
| | | | 725/62 |
| 2014/0295886 A1 | 10/2014 | Tickoo et al. | |
| 2014/0359045 A1 | 12/2014 | Mirarchi et al. | |
| 2015/0172731 A1 | 6/2015 | Hasek et al. | |
| 2017/0223080 A1 * | 8/2017 | Velayudhan | H04L 65/4084 |

* cited by examiner

| Media Content Item | Media Content Distribution Regions |
|---|---|
| Sports Event Live Broadcast | Continental U.S. |
| Cricket Match | United Kingdom |
| TV Comedy | Australia |
| Cartoon | Continental U.S. |

FIG. 3A

| Media Content Item | Media Content Distribution Regions | Authorized to be Distributed |
|---|---|---|
| Sports Event Live Broadcast | Continental U.S. | Yes |
| Sports Event Live Broadcast | United Kingdom | Yes |
| Sports Event Live Broadcast | North Korea | No |
| Cricket Match | United Kingdom | Yes |
| Cricket Match | Australia | No |
| Cartoon | Continental U.S. | Yes |

FIG. 3B

SYSTEMS AND METHODS FOR MANAGING CONTENT DISTRIBUTION TO AN IN-TRANSIT MEDIA SYSTEM

CROSS-REFERENCE TO RELATED APPLICATIONS

This application is a continuation of U.S. patent application Ser. No. 15/209,415 filed Jul. 13, 2016, which claims the benefit of U.S. Provisional Application No. 62/288,600, filed Jan. 29, 2016, which is incorporated by reference in its entirety.

BACKGROUND

The present application relates generally to distribution of media content items to in-transit media systems. More specifically, the present application is directed to managing content distribution to media clients on transport crafts in compliance with media content distribution rights.

Transport crafts, such as commercial aircrafts, trains, boats, etc., may have storage-based media systems that store media content items on a server located on the craft in order to provide in-transit media to local media clients. More recently, transport crafts have included systems that provide for network connectivity while in transit, thereby providing local media clients with additional access to streaming media content from sources remote from the craft. For example, such systems may provide streaming media from a remote content server to a local media client via a wireless communication system on the craft.

SUMMARY

Embodiments of a method for managing media content distribution rights to a media client may include: receiving a request for a media content item from the media client; retrieving a media content distribution region definition for the media content item, wherein the media content distribution region definition indicates one or more media content distribution regions for the media content item; sending the media content distribution region definition for the media content item to a rights location manager; receiving, from the rights location manager, data indicating a current region of the media client, wherein the data is based on a comparison of the media content distribution region definition to a current location of the media client; determining, based on the received data indicating the current region of the media client, whether distribution of the media content item to the media client is authorized within the current region of the media client; initiating a streaming media session for the media content item with the media client when the distribution of the media content item to the media client is authorized within the current region; and providing, via the streaming media session, at least one portion of the media content item to the media client.

Some embodiments of the method may further include denying initiation of the streaming media session for the media content item with the media client when the distribution of the media content item to the media client is not authorized within the current region.

Some embodiments of the method may further include: receiving, from the rights location manager, data indicating an updated region of the media client after providing the at least one portion of the media content item to the media client; determining, based on the received data indicating an updated region of the media client, whether distribution of the media content item to the media client is authorized within the updated region; providing, via the streaming media session, at least one additional portion of the media content item to the media client when distribution of the media content item to the media client is authorized within the updated region; and terminating the streaming media session with the media client when distribution of the media content item to the media client is not authorized within the updated region.

In some embodiments of the method, terminating the streaming media session is due to movement of the media client from an authorized media content distribution region to an unauthorized media content distribution region.

Some embodiments of the method may further include sending, to the rights location manager, a request for the updated region of the media client, and wherein the providing, via the streaming media session, the at least one additional portion of the media content item to the media client, is in response to the request for the updated region of the media client.

In some embodiments of the method, the request for the updated region of the media client is sent periodically.

In some embodiments of the method, the data indicating the updated region of the media client is received in response to movement of the media client.

In some embodiments of the method, the retrieving of the media content distribution region definition for the media content item is based on user information associated with the request.

In some embodiments, the media client is on a transport craft.

In some embodiments, the media client is associated with a fixed terminal.

Embodiments of a system for managing media content distribution rights to a media client may include: a memory comprising computer-executable code; at least one processor in data communication with the memory, and configured to execute the computer-executable code and cause the system to: receive a request for a media content item from the media client; retrieve a media content distribution region definition for the media content item, wherein the media content distribution region definition indicates one or more media content distribution regions for the media content item; send the media content distribution region definition for the media content item to a rights location manager; receive, from the rights location manager, data indicating a current region of the media client, wherein the data is based on a comparison of the media content distribution region definition to a current location of the media client; determine, based on the received data indicating the current region of the media client, if distribution of the media content item to the media client is authorized within the current region of the media client; initiate a streaming media session for the media content item with the media client if the distribution of the media content item to the media client is authorized within the current region; and provide, via the streaming media session, at least one portion of the media content item to the media client.

In some embodiments of the system, the processor is further configured to cause the system to: deny initiation of the streaming media session for the media content item with the media client if the distribution of the media content item to the media client is not authorized within the current region.

In some embodiments of the system, the processor is further configured to cause the system to: receive, from the rights location manager, data indicating an updated region of the media client after providing the at least one portion of the media content item to the media client; determine, based on the received data indicating an updated region of the media client, whether distribution of the media content item to the media client is authorized within the updated region; provide, via the streaming media session, at least one additional portion of the media content item to the media client when the distribution of the media content item to the media client is authorized within the updated region; and terminate the streaming media session with the media client when the distribution of the media content item to the media client is not authorized within the updated region.

In some embodiments of the system, the termination of the streaming media session is due to movement of the media client from an authorized media content distribution region to an unauthorized media content distribution region.

In some embodiments of the system, the processor is further configured to cause the system to: send, to the rights location manager, a request for the updated region of the media client, and wherein the provision, via the streaming media session, of the at least one additional portion of the media content item to the media client is in response to the request for the updated region of the media client.

In some embodiments of the system, the processor is further configured to cause the system to: request the updated region of the media client periodically.

In some embodiments of the system, the receipt of the data indicating the updated region of the media client is in response to movement of the media client.

In some embodiments of the system, the retrieval of the media content distribution region definition for the media content item is based on user information associated with the request.

In some embodiments of the method and system, the movement of the media client is from within the current region to outside the current region.

BRIEF DESCRIPTION OF THE DRAWINGS

The present disclosure is described in conjunction with the appended figures.

FIGS. 3A and 3B depict various examples of media content distribution rights stored by a content server.

DETAILED DESCRIPTION

Figure 1:
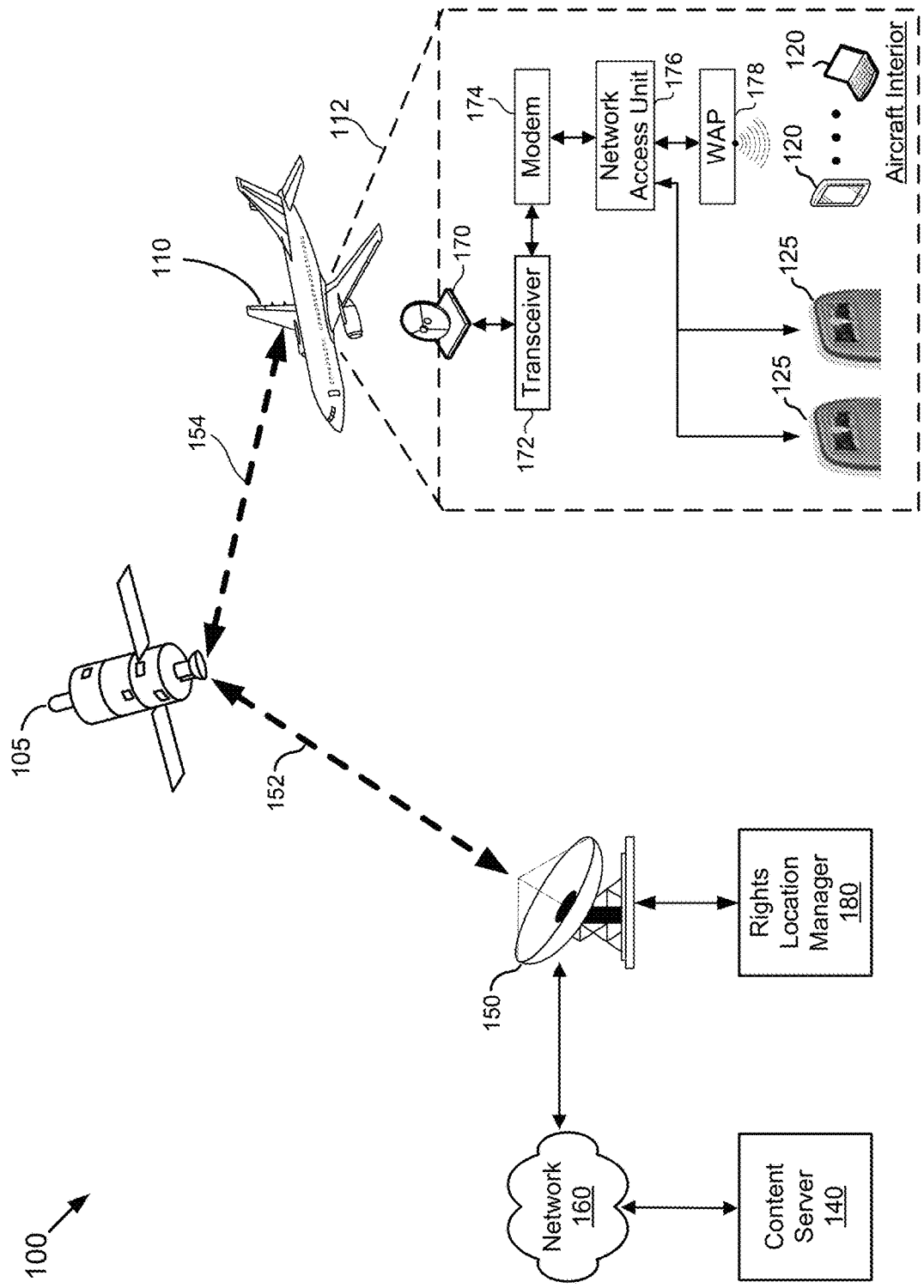
FIG. 1 depicts a simplified diagram of a satellite communication system.

Systems and methods are described herein for distributing media content items to in-transit media systems in compliance with media content distribution rights.

Media content items such as television shows and movies are often subject to licenses that restrict the distribution of the media content items. One type of restriction limits the geographical locations where the media content items may be distributed. In the past, when media content items were primarily distributed physically, content distribution rights may have been easily enforced by managing the use of the physical media (e.g., a DVD). As an example, administrators of in-flight entertainment systems that store content locally on airplanes could choose to physically remove or disable playback of media from the entertainment system when the transport craft was in a location not authorized for the media. However, with the availability of data connectivity on transport crafts to sources accessible via remote networks such as the Internet, passengers may have access to media content from providers that are independent of and unaffiliated with the transport craft operator. As such, the methods of restricting distribution of media content items previously used with in-flight entertainment systems may no longer be effective or easily implemented.

The advent of continuous network connectivity, which may enable access to remote media content items at all times during transit, requires a carrier to consider whether distribution rights associated with any particular media content item allow for distribution of that media content item at all times during transit. For example, a commercial carrier may only have the right to distribute a particular media content item within a specific geographical region, such as the United States, while the commercial carrier may have the right to distribute another media content item throughout both the United States and Europe. Consequently, as a particular transport craft travels between different regions, the media content items available to local media clients may change. Accordingly, systems and methods are needed to manage the distribution of media content items in compliance with their associated media content distribution rights.

An in-transit media system in a transport craft may establish a communication link via a data carrier (e.g., satellite beams, towers, cells, etc.), in order to provide a media content item (e.g., streaming media content) from a content server to media clients associated with or otherwise in data communication with the in-transit media system. As the transport craft moves from location to location, it may exit a region for which the content server is authorized to distribute a particular media content item to the in-transit media system on the transport craft and enter a different region in which the content server is not authorized to distribute the media content item to the in-transit media system on the transport craft. The media content distribution rights associated with a media content item may define where the media content item can be distributed, e.g., a region in which distribution is authorized. Thus, the in-transit media system may work with the content server to stay in compliance with the content distribution rights related to media content items provided to the in-transit media system.

The content server may need to verify that the current location of a transport craft is within a region for which the content server is authorized to distribute the media content item. However, the current location data of a transport craft may be purposefully or otherwise unavailable to the content server for security reasons (e.g., to protect the exact location of the transport craft), privacy reasons, or other reasons. For example, a content provider operating the content server may be different than the operator of the transport craft and/or the operator of the communication system over which the content item will be communicated to the transport craft. Thus, providing the current location data of the transport craft to the content server may not always be possible.

To solve this problem, embodiments described herein may include a rights location manager that may be able to access the current location of the transport craft. In some embodiments, the rights location manager may provide the content server with the current region of the transport craft, rather than the current location of the transport craft, based on the regional definitions provided by the content server. In other embodiments, the rights location manager may simply provide a binary result (e.g., yes or no) indicating whether or not the current location of the transport craft is within a region defined by the region definitions. By providing only the current region or an indication of being in a region to the content server, the rights location manager enables the content server to distribute media content items to the transport craft in compliance with media content distribution rights, but without knowing the precise current location of the transport craft.

FIG. 1 depicts a simplified diagram of an example satellite communication system 100. Many other configurations having more or fewer components than the satellite communication system 100 of FIG. 1 are possible. Satellite communication system 100 includes transport craft 110 in data communication with content server 140 via communication link 154, satellite 105, communication link 152, ground terminal 150, rights location manager 180, and network 160. Communication links 152 and 154 may enable a communication link between transport craft 110 and the content server 140. As depicted in FIG. 1, media content items can be obtained from content server 140 via network 160 and ground terminal 150 (and/or other terrestrial stations, gateways, or other network nodes).

While a single transport craft 110 (in this example, an airplane) is shown in communication via a single satellite 105 in FIG. 1, the techniques described herein can be applied in many other communication environments without departing from the scope of the inventions. For example, transport crafts capable of participating in the communication system shown in FIG. 1 may include: aircraft (e.g., airplanes, helicopters, blimps, balloons, etc.), trains, automobiles (e.g., cars, trucks, busses, etc.), watercraft (e.g., private boats, commercial shipping vessels, cruise ships, etc.) and others as are known to those of skill in the art. Any or all such transport crafts may communicate via any one or more suitable communication system(s), including any suitable communication links, such as: a satellite communication system, an air-to-ground communication system, a hybrid satellite and air-to-ground communication system, a cellular communication systems, and others as are known by those of skill in the art. Because of the mobile nature of transport craft 110, the communication system will likely involve at least one wireless communication link, such as the aforementioned examples.

Ground terminal 150 may enable bidirectional communication with satellite 105. In some embodiments, ground terminal 150 may be known as a terrestrial station or a gateway. Ground terminal 150 may also be in data communication with network 160 and thereby to content server 140. Ground terminal 150 may also be in data communications with rights location manager 180.

Transport craft 110 may include two-way communication system 112 to facilitate bidirectional communication with satellite 105. In the example depicted in in FIG. 1, two-way communication system 112 includes antenna system 170, transceiver 172, modem 174, network access unit 176, wireless access point (WAP) 178. Two-way communication system 112 may receive a forward downlink signal from satellite 105 and transmit a return uplink signal to the satellite 105 via communication link 154.

Media clients 120 may include, for example, mobile devices such as personal electronic devices (e.g., smart-phones, laptops, tablets, netbooks, and the like) brought onto craft 110 by passengers. As further examples, media clients 125 can also include fixed or on-craft devices, such as passenger seat-back systems or other devices on the transport craft 110. Media clients 120 and 125 may communicate with the network access unit 176 via a communication link that can be wired and/or wireless (e.g., via wireless access point 178). The communication link can be, for example, part of a local area network such as a wireless local area network (WLAN) supported by wireless access point 178. One or more wireless access points 178 may be distributed about the craft 110 and may, in conjunction with network access unit 176, provide traffic switching and routing functionality.

The media clients 120 and 125 may execute one or more applications that allow users on the transport craft 110 an interface for communicating with the content server 140 to obtain and consume media content items in a streaming (or progressively downloaded manner) via the satellite 105, ground terminal 150, satellite 105, and two-way communication system 112. The user may have the option to select a media content item from the interface. When a user selects a particular media content item for access, the media clients 120 and 125 may transmit that request to access the media content item to the content server 140 through the satellite communication system 100. The content server 140, upon receiving the request, may then determine whether it has authorization to distribute the media content item to the media clients 120 and 125 using the techniques described herein. The users of the media clients 120 and 125 may for example be subscribers of a streaming media service provided by the content server 140. As another example, the content server 140 may not require a subscription to access the media content items. As yet another example, the subscription to the media content items may be associated with the operator of the craft 110 and/or the operator of the communication system 100.

In other embodiments, media clients may be associated with fixed or nomadic terminals, such as buildings or other structures. In such alternate embodiments, the fixed or nomadic terminal may still be within media content distribution regions, but is not regularly mobile.

Network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. Further, network 160 can include both wired (e.g., copper and optical) and wireless (e.g., radio and microwave) connections.

Content server 140 may provide various types of media content items, such as linear media content items (e.g., linear audio and/or video media). Linear media content items generally refers to any stream of content that is scheduled for delivery at a certain time (e.g., a television show run at a set time, a live event, a televised sporting event, etc.). For example, various broadcast television channel offerings may be available from the content server 140.

Content server 140 may also provide non-linear programming (e.g., video on demand), which may be available on-demand to media clients 120 and 125 via the satellite communication system 100. Both linear and non-linear media content items can be communicated from content server 140 to media clients 120 and 125 (e.g., in response to requests for such media from the media clients 120), while in flight, via satellite 105. Although only one content server 140 is depicted in FIG. 1 for simplicity, media clients 120 and 125 may receive content from one or more other content servers. Each content server 140 may for example be associated with different streaming media content providers.

Content server 140 may include one or more media servers, media storage devices, etc., as well as other data stores.

As discussed above, content server 140 may receive a request for a media content item from media clients 120 and 125 through the satellite communication system 100. In some embodiments, the content server 140 may not have access to the current location of the transport craft 110 from which media clients 120 and 125 have requested the media content item. In such embodiments, the content server 140 may retrieve media content distribution rights for the requested media content item, which may, for example, define media content distribution regions within which the media content item may or may not be distributed. The media content distribution rights data (including any associated media content distribution region definitions) may be stored on the content server 140 or on a separate device in data communication with the content server 140. The media content distribution rights data may be stored in a table or any other type of data structure.

Media content distribution rights may be defined in many ways. For example, a media content distribution right may include a media content distribution region defined by geographical features, such as the continent of North America, wherein all locations within the continent of North America are authorized for distribution of a media content item. As another example, a media content distribution right may include a media content distribution region defined by an area within a continent, such as Central Asia, or a nation-state, such as Mexico or Canada, or a time-based region, such as all locations found in Eastern Standard Time. As yet another example, a media content distribution right may include a media content distribution region defined by arbitrary shapes (e.g., defined by sets of coordinates) or with reference to longitude and latitude (e.g., as all locations below a certain meridian, or all locations south of the Equator). Media content distribution rights may also be defined by one or more locations, regions, etc. associated with a convention or treaty, such as the TRIPs Agreement. In some embodiments, media content distribution rights may also include combinations of the factors mentioned above.

In some embodiments, a media content distribution right may include a plurality of media content distribution regions, such as a first media content distribution region including locations within the United States (a nation-state) and a second media content distribution region including locations within South America (a continent).

In some embodiments, a media content distribution right may include media content distribution regions for which distribution is authorized or media content distribution regions for which distribution is not authorized. For example, a media content distribution right may prohibit distribution within the United States.

Media content distribution rights may also be based on user information associated with the user requesting a media content item through the media client. For example, a content server may be authorized to distribute a media content item to a particular user in all media content distribution regions while the content server may only be authorized to distribute the media content item to another user in certain media content distribution regions. As another example, the user information may be related to the carrier (e.g., airline) or provider of the media client. As yet another example, the user information may associated with a particular craft (e.g., a particular airplane) containing the media client and/or the source and/or destination of the craft. As yet another example, the user information may be associated with the headquarters of the carrier.

User information may be transmitted with the request for the media content item, and may include any sort of aspect associated with the user.

Media content distribution rights may also be based on additional information, for example, the owner of the transport craft containing the media client, the technology supporting the media client, the technology in the transport craft, or the source and/or the destination of the craft. Other types of information are possible as would be appreciated by one of skill in the art.

Upon determining the media content distribution right (including any associated media content distribution region definitions) for a requested media content item, the content server 140 may send, for example, the media content distribution region definition(s) to the rights location manager 180. The content server 140 may also send information (e.g., the source IP address within the request for media content item) that can be used by the rights location manager 180 to identify the particular transport craft 110 from which the request originated. In embodiments in which the content server 140 provides media streaming service to other media clients that may not be located on a transport craft, the content server 140 may analyze the request to determine whether or not the request originated from a media client on a transport craft. If the content server 140 determines that the request was from a media client on a transport craft, the content server 140 may then send the media content distribution region definition(s) to the rights location manager 180. A variety of techniques may be used to determine whether the request originated from a transport craft. For example, in some embodiments the content server 140 stores a list of IP addresses of the various two-way communication systems 112 on the various transport craft 110, and looks up the source IP address within the request in the list to determine whether or not the request originated from a media client on a transport craft.

Rights location manager 180 may include a data store or server. The functions of the rights location manager 180 can be implemented in hardware, instructions embodied in memory and formatted to be executed by one or more general or application-specific processors, firmware, or any combination thereof. In the example depicted in FIG. 1, rights location manager 180 is shown as a separate device that is earth-bound. In other embodiments, some or all of the functionality of the rights location manager 180 may be placed within the transport craft 110.

The rights location manager 180 may have access to the current location of the transport craft 110. In some embodiments, the rights location manager 180 receives the current location of the transport craft 110 from the transport craft 110 itself through the satellite communication system 100. For example, the current location of the transport craft 110 may be provided via a global positioning system (GPS) or other equipment on the transport craft 110. In other embodiments, the rights location manager 180 may determine the current location based on, for example, current speed and expected travel route or heading of the transport craft 110. In yet other embodiments, the rights location manager 180 may receive the current location of the aircraft from other sources, such as flight tracking radar services and the like. In yet other embodiments, the rights location manager 180 may determine the current location based on the manner in which the transport craft 110 communicates with the satellite communication system 100. For example, in embodiments in which the satellite 105 is a satellite having a coverage area only over the continental United States, the current location may be determined based on whether or not the transport craft 110 is communicating with the satellite 105. As another example, in embodiments in which the satellite 105 is a multi-beam satellite with spot beams having different coverage areas, the current location may be the coverage area of the spot beam with which the transport craft 110 is communicating with the satellite 105. Thus, it will be understood that the current location of the transport craft 110 obtained by the rights location manager 180 may not necessarily be its precise location. Rather, the current location may be a geographic area with boundaries sufficient that the techniques described herein can be used.

Upon receiving the media content distribution region definition(s) for a requested media content item, the rights location manager 180 may identify the particular transport craft 110 from which the request originated. For example, in embodiments in which the rights location manager 180 sends the source IP address within the request for media content item, the rights location manager 180 may check the source IP address against a list of IP addresses associated with the various transport crafts 110. The rights location manager 180 may then compare the current location of the transport craft 110 to the media content distribution regions and determine which of the media content distribution regions the transport craft 110 is currently in. For example, the rights location manager 180 may have received a media content distribution region definition from the content server 140 defining a first media content distribution region including locations within the United States and a second media content distribution region including locations within Europe. The rights location manager 180 may compare the current location of the transport craft 110 to the first and second media content distribution regions and determine that the current region of the transport craft 110 is the first media content distribution region, i.e., the United States. The rights location manager 180 may then communicate to the content server 140 that the transport craft 110 is in the first media content distribution region.

In some embodiments, the rights location manager 180 may determine that the transport craft is not within any of the defined media content distribution regions. The rights location manager 180 may then communicate to the content server 140 data indicating only that no match was made, rather than any current region of the transport craft.

Figure 2:
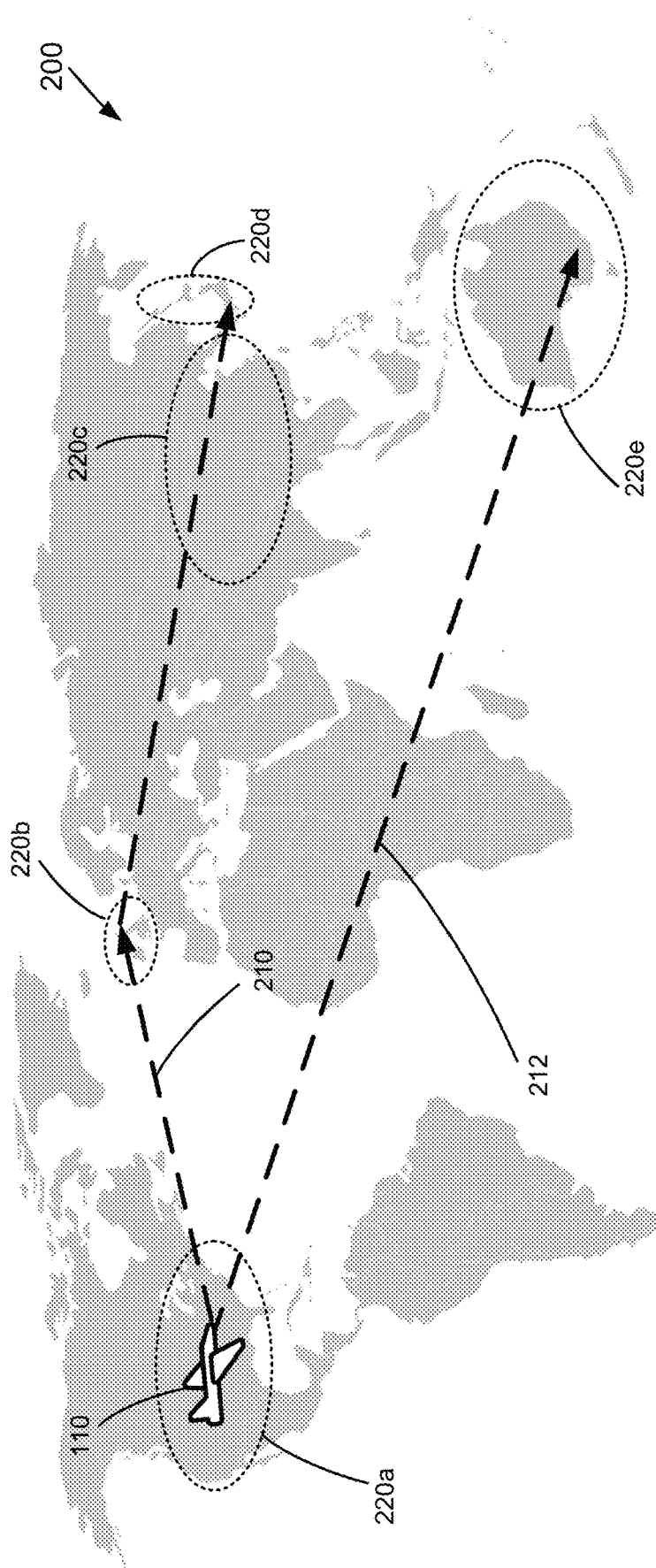
FIG. 2 depicts a simplified diagram of how a craft may move through various media content distribution regions while in transit.

FIG. 2 provides an example of how a transport craft 110 may travel through several media content distributions regions, such as 220*a-e*, while in transit along a path 210 or a path 212. For example, path 210 takes transport craft 110 from a media content distribution region 220*a*, which includes the United States, to another media content distribution region 220*d*, which includes Japan, while also traversing media content distribution regions including the United Kingdom and China (220*b* and 220*c*, respectively). Path 212 takes transport craft 110 from media content distribution region 220*a*, which includes the United States, to media content distribution region 220*e*, without passing through any other media content distribution regions. In embodiments, a particular media content item may only be authorized for distribution in media content distribution region 220*b*, which means that flights along path 212 would never have access to that particular media content item.

FIGS. 3A and 3B provide examples of media content distribution rights data (including any associated media content distribution region definitions), including media content distribution regions, which may be used by the content server and the rights location manager in order to determine whether a media content item may be distributed to a media client. For example, as shown in FIG. 3A, the content server may distribute the media content item "Sports Event Live Broadcast" to the continental United States whereas the content server may distribute the media content item "Cricket Match" to the United Kingdom.

FIG. 3B, provides another example of media content distribution rights data (including any associated media content distribution region definitions), including media content distribution regions. In FIG. 3B, each media content item may have multiple media content distribution regions along with authorization settings for each media content distribution region. For example, the media content item "Sports Event Live Broadcast" is associated with three media content distribution regions, and each media content distribution regions includes an authorization setting. Thus, in the example depicted in FIG. 3B, "Sports Event Live Broadcast" may be distributed to the Continental U.S. and to the United Kingdom, but not to North Korea.

Figure 4:
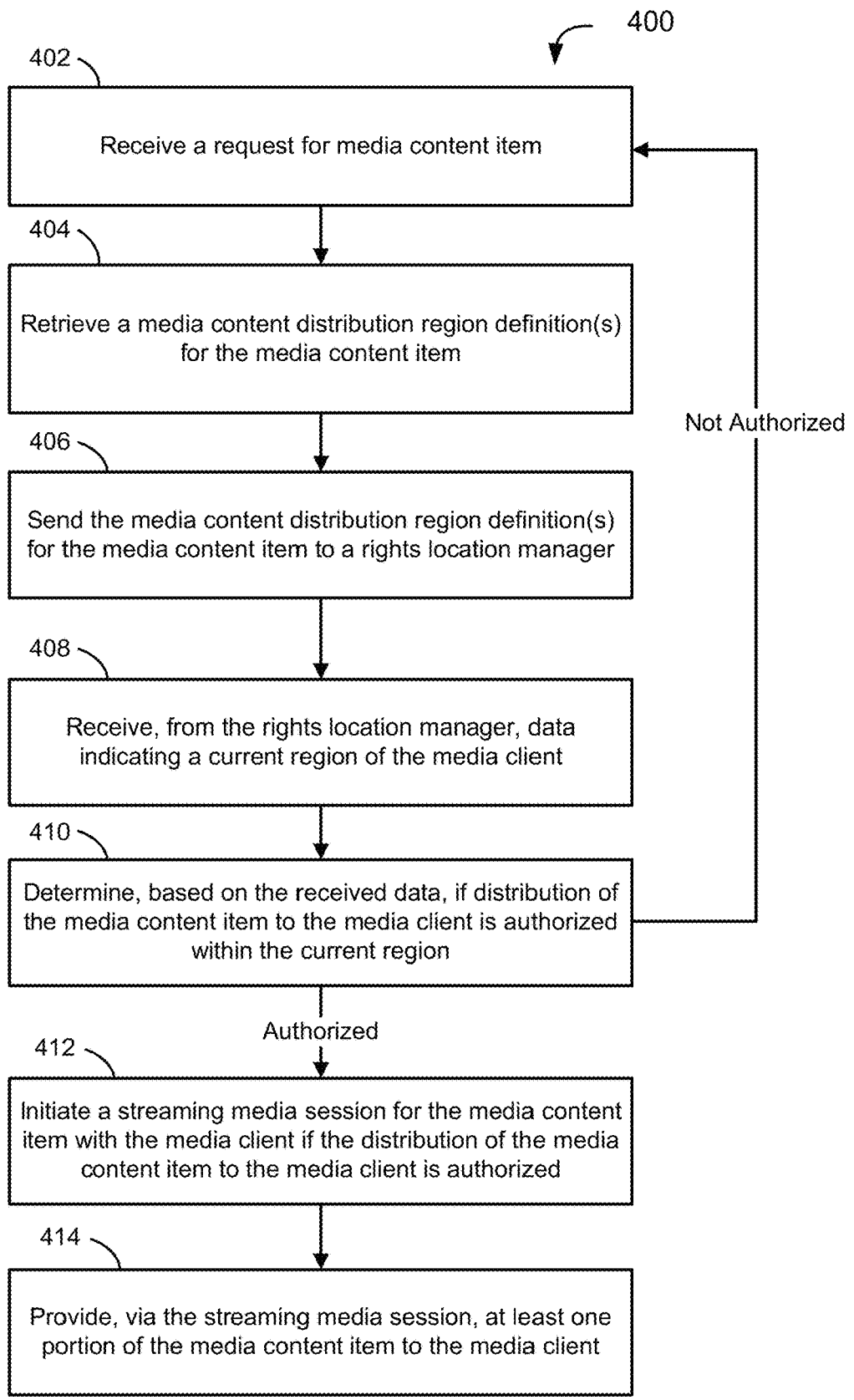
FIG. 4 depicts an embodiment of a method for managing media content distribution rights to a mobile platform.

FIG. 4 shows an embodiment of a method for managing distribution of media content items to in-transit media systems in compliance with media content distribution rights.

In step 402, a content server receives a request for a media content item. The request may have originated from a media client such as 120 or 125 on a transport craft, such as craft 110. For example, the requested media content item could be on-demand content, such as a movie, a song, or a television show, or the media content item may alternatively be linear media data, such as a live television program.

In step 404, the content server retrieves media content distribution rights data including one or more media content distribution region definition(s) for the requested media content item. As discussed in relation to FIG. 3A, the media content distribution region definition(s) for a requested media content item may define one or more media content distribution regions in which the content server may or may not have authorization to distribute the media content item.

In step 406, the content server sends the retrieved media content distribution region definition(s) for the requested media content item to a rights location manager.

Upon receiving the media content distribution region definition(s), the rights location manager may determine whether the transport craft (and associated media client) is within one of the defined media content distribution regions.

At step 408, the content server receives data indicating whether or not the transport craft is in one of the defined media content distribution regions.

In other embodiments, the rights location manager may instead provide a response indicating whether the current region of the transport craft is in one of the authorized regions for distribution of the media content item (e.g., the Boolean response could be 'true'; otherwise if the current region of the transport craft is in an unauthorized region, the Boolean response would be 'false'). In such an embodiment, i.e., where the rights location manager indicates that the media client is in an authorized content distribution region, the content server may go directly to step 412 and initiate the streaming of the requested media content item.

At step 410, the content server determines, based on the data indicating the current region of the transport craft and media client, whether distribution of the media content item to the transport craft and media client is authorized.

If the data received from the rights location manager, which may be the current region of the media client, indicates that the media client is not within an authorized media content distribution region, then the method returns to step 402 and awaits another request for a media content item.

If the data received from the rights location manager indicates that the media client is within an authorized media content distribution region, then at step 412 the content server initiates a streaming media session for the media content item on the media client. The streaming media session can be established between the content server and the media client on the transport craft through a communication system, such as a satellite communication system, an air-to-ground communication system, a cellular communication system, and others as known by those of skill in the art.

At step 414 the content server provides at least one portion of the media content item to the media client on the transport craft.

Notably, while an initial authorization determination is made in FIG. 4, the transport craft may transit out of one region and into another region, which may or may not be authorized for distribution of the requested media content item. As such, the content server and the region location manager may periodically determine whether the transport craft is within an updated media content distribution region and whether or not that updated media content distribution region is an authorized content distribution region. The periodic determination may occur on a regular time interval, an irregular time interval, or be triggered by an event, such as the transport craft passing into a new geographic area (independent of the media content distribution regions defined by the content server).

Figure 5:
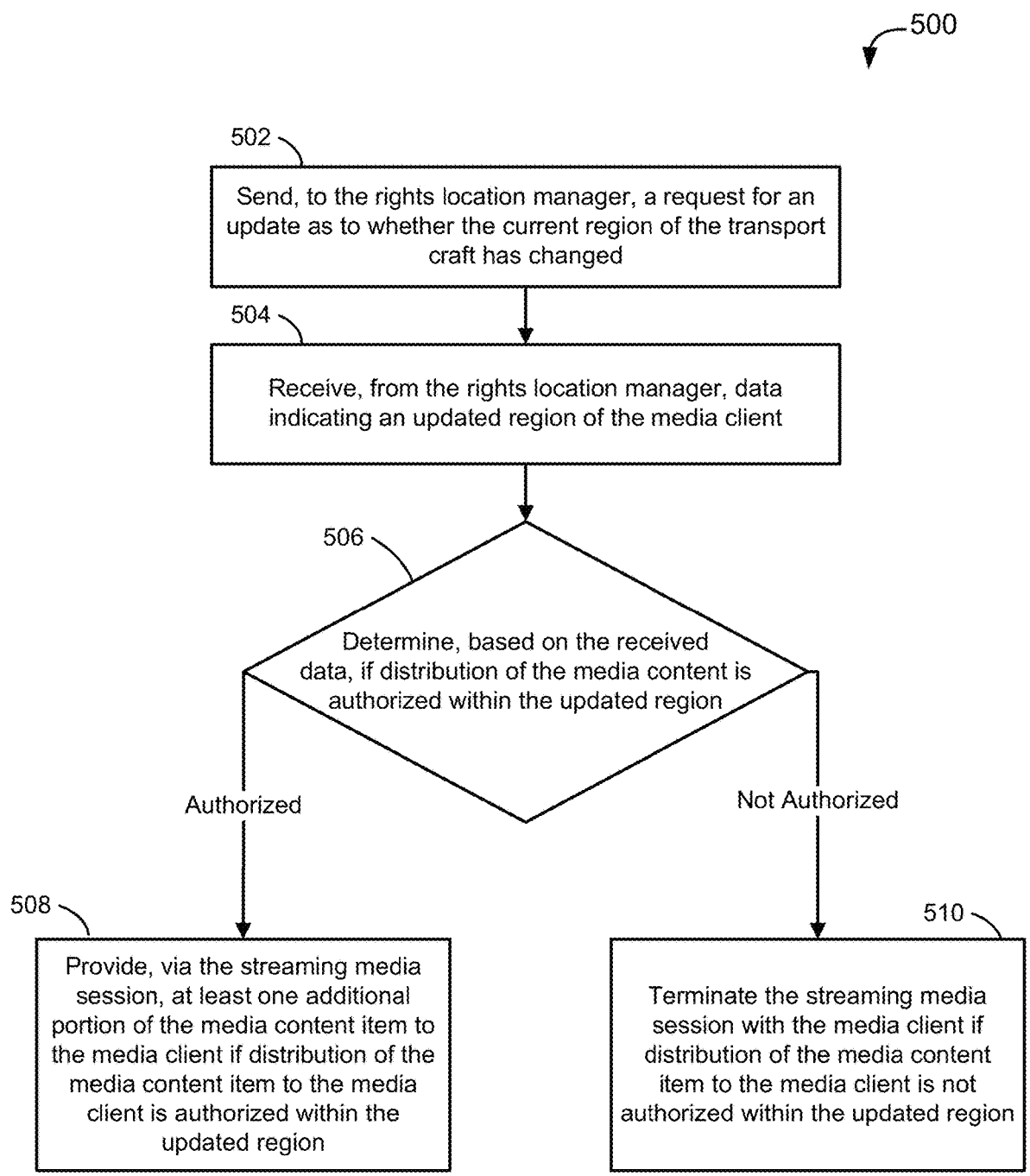
FIG. 5 depicts an embodiment of a method for managing media content distribution rights to a mobile platform.

FIG. 5 depicts an embodiment of a method 500 for periodically re-authorizing the distribution of media content items to an in-transit media system.

At step 502, while a streaming media session exists between the content server and the media client on a transport craft, and after at least one portion of a media content item has been received by the media client on the transport craft, the content server may request an update from the rights location manager as to whether the current region of the transport craft has changed. In response, the rights location manager may again compare the media content distribution region definition(s) for the received media content item to an updated location of the transport craft in order to determine the current content distribution region of the transport craft. The result of the comparison may be data indicating an updated region for the media client.

At step 504, the content server receives, from the rights location manager, data indicating an updated region for the transport craft and media client.

In some embodiments, when the media content distribution region definition defines only the authorized content distribution regions for the media content item, the data resulting from the comparison of the content distribution regions and the transport craft's updated location may be limited to only an indication that the media client is within an authorized content distribution region. When the data is only an indication that the media client is still in an authorized content distribution region, the content server may be directed to continue providing portions of the media content item in the streaming media session.

At step 506, the content server determines, based on the data indicating the updated region of the media client, whether distribution of the media content item to the media client is still authorized.

If the content server determines that the updated region of the media client is still authorized, then at step 508, the content server provides at least one additional portion of the media content item via the streaming media session to the media client on the transport craft.

If the content server determines that the updated region of the media client is not authorized, then at step 510 the content server terminates the streaming media session.

As described above, in some embodiments, the content server may periodically request an updated region of the media client. In other embodiments, instead of waiting for the request for an updated region from the content server, the rights location manager may periodically update the location of the media client and send updated location data to the content server proactively. For example, the rights location manager may, without prompting from the content server, compare the received media content distribution region definition to the current location of the media client. Upon determining that the media client is in a new content distribution region, the rights location manager may send data indicating an updated region of the media client.

Figure 6:
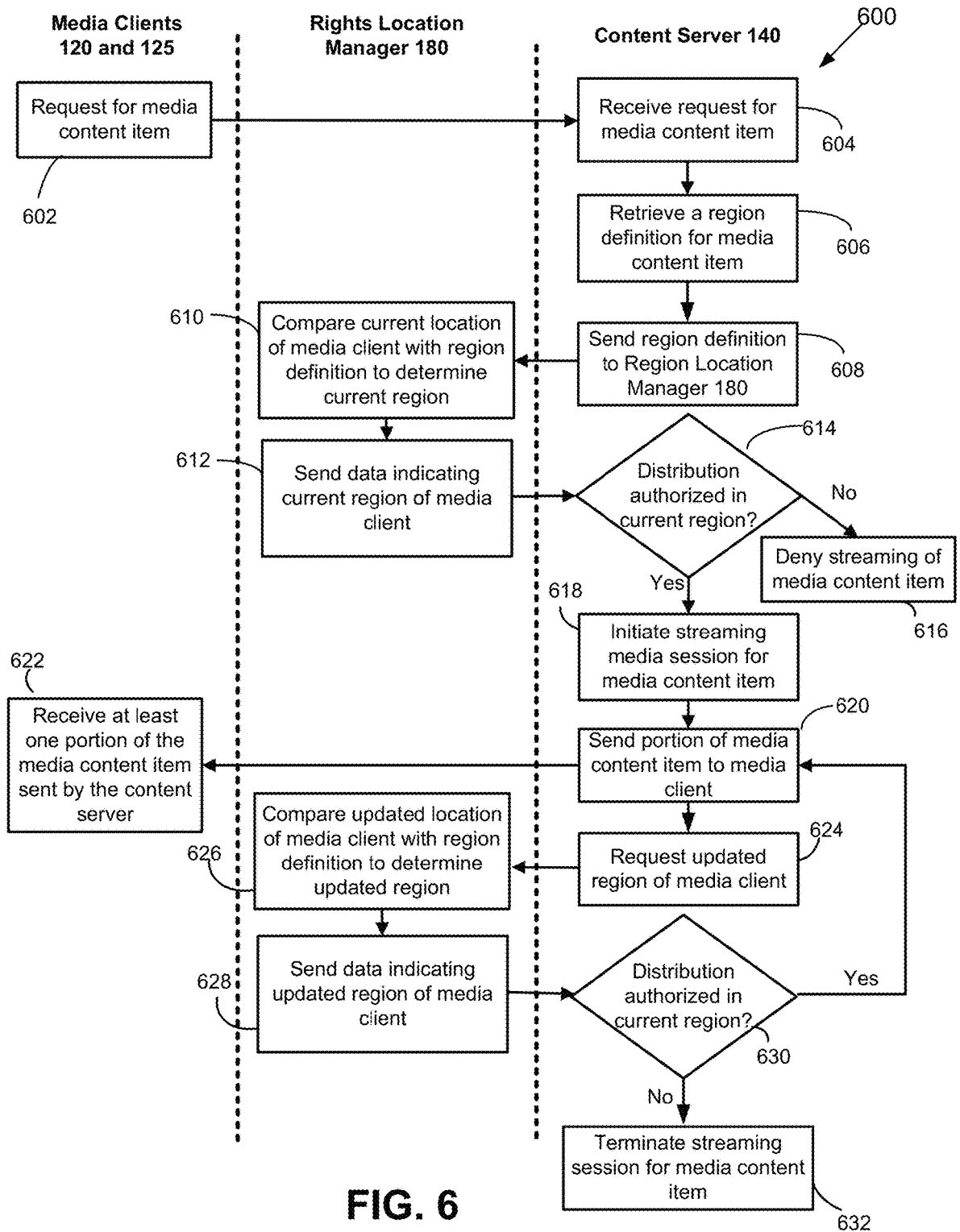
FIG. 6 depicts a flow diagram of aspects of a system and methods for distributing media content items to in-transit media systems in compliance with media content distribution rights.

FIG. 6 shows a flow diagram 600 of aspects of a system for managing media content distribution to an in-transit media system in compliance with media content distribution rights.

At step 602 a media client in a transport craft makes a request for a media content item. The media content item may be, for example, a live television show.

At step 604, the content server receives the request for the media content item.

At step 606, the content server retrieves media content distribution rights data including one or more media content distribution region definition(s) for the media content item. As previously discussed, the media content distribution region definition(s) for the media content item may define one or more media content distribution regions within which distribution of the media content item is authorized or unauthorized.

At step 608, the content server sends the retrieved one or more media content distribution region definition(s) to the rights location manager.

At step 610, the rights location manager compares the current location of the transport craft (associated with the media client) with the one or more media content distribution region definition(s) to determine whether the transport craft is within any of the defined media content distribution regions.

At step 612, the rights location manager sends data indicating the current region of the media client to the content server. In other embodiments, the data may indicate only whether the media client and transport craft are within an authorized content distribution region, without identifying which region the media client and transport craft are within. In yet other embodiments, the rights location manager may send data indicating that the transport craft is not within any of the defined media content distribution regions.

At step 614, the content server determines, based on the data indicating a current region of the transport craft (associated with the media client), whether the distribution of the media data content item is authorized within the current region of the media client.

If the content server determines that the current region of the transport craft (associated with media client) is not authorized for distribution of the media content item, then at step 616 the content server does not initiate a streaming media session, and the media content item will not be provided to the media client on the transport craft.

If the content server determines that the current region of the transport craft (associated with media client) is authorized for distribution of the media content item, then at step 618, the content server initiates a streaming media session with the media client.

At step 620, the content server sends at least one portion of the media content item to the media client on the transport craft.

At step 622, the media client on the transport craft receives the at least one portion of the media content item sent by the content server.

At step 624, the content server sends a request to the rights location manager to determine whether the transport craft (associated with the media client) is still within an authorized content distribution region. As described above, such a request may occur at regular intervals, irregular intervals, or in response to some event.

At step 626, in response to the content server's request to provide an updated region of the media client, the rights location manager compares the updated location of the transport craft (associated with the media client) with the media content distribution region definition(s) provided by the content server at step 608 to determine an updated region of the media client.

At step 628, the rights location manager sends data indicating an updated region of the media client.

At step 630, the content server determines, based on the received data, whether the distribution of the media content item is authorized within the updated region of the media client.

If the content server determines that the current region of the transport craft (associated with media client) is not authorized for distribution of the media content item, then at step 632, the content server terminates the streaming media session with the media client.

If the content server determines that the current region of the transport craft (associated with media client) is authorized for distribution of the media content item, then the content server returns to step 620 and provides another portion of the media content item requested by the media client.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In the present disclosure, certain terminology is used in the following ways. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for managing media content distribution rights to a media client located on a transport craft, the method comprising:
    receiving, at a rights location manager, a media content distribution region definition for a media content item from a content server in response to a request for the media content item from the media client located on the transport craft, wherein the media content distribution region definition indicates one or more media content distribution regions for the media content item;
    comparing a current location of the transport craft to the one or more media content distribution regions to determine a current region of the one or more media content distribution regions that includes the current location of the transport craft; and
    sending, from the rights location manager, data indicating the current region to the content server for determining whether distribution of the media content item to the media client located on the transport craft is authorized, wherein the data is based on the comparison.

2. The method of claim 1, further comprising:
    determining the current location of the transport craft.

3. The method of claim 2, wherein determining the current location of the transport craft further comprises:
    receiving an indication of the current location from the transport craft or a satellite communication system in communication with the transport craft.

4. The method of claim 2, wherein determining the current location of the transport craft further comprises:
    determining a current speed and expected travel route of the transport craft; and
    deducing the current location of the transport craft from the current speed and the expected travel route.

5. The method of claim 2, wherein determining the current location of the transport craft further comprises:
    receiving an indication of the current location from a flight tracking radar service.

6. The method of claim 2, wherein determining the current location of the transport craft further comprises:
    determining the current location based on a coverage area of a spot beam used by the transport craft for communicating with a satellite.

7. The method of claim 1, wherein the data indicating the current region of the one or more media content distribution regions that includes the current location of the transport craft is a Boolean value indicating whether the current location of the transport craft is within the one or more media content distribution regions.

8. The method of claim 1, further comprising:
    determining an updated location of the transport craft;
    comparing the updated location of the transport craft to the one or more media content distribution regions to determine an updated region of the one or more media content distribution regions that includes the updated location of the transport craft; and
    sending, from the rights location manager, data indicating the updated region to the content server, wherein the data is based on the comparison of the updated location to the one or more media content distribution regions.

9. The method of claim 8, further comprising:
    receiving, from the content server, a request to update the current region of the transport craft.

10. The method of claim 1, further comprising:
    periodically sending data indicating an updated region of the one or more media content distribution regions that includes an updated location of the transport craft to the content server.

11. The method of claim 1, further comprising:
    determining movement of the transport craft from the current region of the one or more media content distribution regions to a different region;
    sending, from the rights location manager, data indicating an updated region of the one or more media content distribution regions that includes an updated location of the transport craft to the content server.

12. The method of claim 11, wherein the movement of the transport craft is from within the current region to outside the current region.

13. A system for managing media content distribution rights to a media client located on a transport craft, the system comprising:
    at least one processor a memory in data communication with the at least one processor and comprising computer-executable code which, when executed by the at least one processor, cause the system to:
  receive, at a rights location manager, a media content distribution region definition for a media content item from a content server in response to a request for the media content item from the media client located on the transport craft, wherein the media content distribution region definition indicates one or more media content distribution regions for the media content item;
  compare a current location of the transport craft to the one or more media content distribution regions to determine a current region of the one or more media content distribution regions that includes the current location of the transport craft; and
  send, from the rights location manager, data indicating the current region to the content server for determining whether distribution of the media content item to the media client located on the transport craft is authorized, wherein the data is based on the comparison.

14. The system of claim 13, wherein the computer-executable code, when executed by the at least one processor, causes the system to:
  determine the current location of the transport craft.

15. The system of claim 14, wherein the computer-executable code, when executed by the at least one processor, causes the system to:
  receive an indication of the current location from the transport craft or a satellite communication system in communication with the transport craft;
  determine the current location from a current speed and expected travel route or heading of the transport craft;
  receive an indication of the current location from a flight tracking radar service; or
  determine the current location based on a coverage area of a spot beam used by the transport craft for communicating with a satellite.

16. The system of claim 13, wherein the data indicating the current region of the one or more media content distribution regions that includes the current location of the transport craft is a Boolean value indicating whether the current location of the transport craft is within the one or more media content distribution regions.

17. The system of claim 13, wherein the computer-executable code, when executed by the at least one processor, causes the system to:
  determine an updated location of the transport craft;
  compare the updated location of the transport craft to the one or more media content distribution regions; and
  send, from the rights location manager, data indicating an updated region of the one or more media content distribution regions that includes the updated location of the transport craft to the content server, wherein the data is based on the comparison of the updated location to the one or more media content distribution regions.

18. The system of claim 17, wherein the computer-executable code, when executed by the at least one processor, causes the system to:
  receive, from the content server, a request for updating the current region of the transport craft.

19. The system of claim 13, wherein the computer-executable code, when executed by the at least one processor, causes the system to:
  periodically send data indicating an updated region of the one or more media content distribution regions that includes an updated location of the transport craft to the content server.

20. The system of claim 13, wherein the computer-executable code, when executed by the at least one processor, causes the system to:
  determine movement of the transport craft from the current region of the one or more media content distribution regions to a different region;
  send, from the rights location manager, data indicating an updated region of the one or more media content distribution regions that includes an updated location of the transport craft to the content server.

* * * * *